United States Patent
Shibata et al.

(10) Patent No.: US 7,056,203 B2
(45) Date of Patent: Jun. 6, 2006

(54) AIR-CONDITIONING RESISTOR AND OPERATING UNIT

(75) Inventors: Minoru Shibata, Aichi (JP); Etsuo Ozawa, Aichi (JP); Katsuhiro Katagiri, Aichi (JP)

(73) Assignee: Toyoda Gosei. Co. Ltd., Aichi-ken (JP)

( * ) Notice: Subject to any disclaimer, the term of this patent is extended or adjusted under 35 U.S.C. 154(b) by 15 days.

(21) Appl. No.: 10/801,661

(22) Filed: Mar. 17, 2004

(65) Prior Publication Data
US 2004/0203334 A1 Oct. 14, 2004

(30) Foreign Application Priority Data
Mar. 28, 2003 (JP) .......................... P2003-092359

(51) Int. Cl.
*F24F 13/14* (2006.01)
(52) U.S. Cl. ...................... 454/155; 454/319; 454/320; 454/325
(58) Field of Classification Search ................. 454/155, 454/202, 315, 318, 319, 320, 322, 325, 327
See application file for complete search history.

(56) References Cited

U.S. PATENT DOCUMENTS 6,830,511 B1 * 12/2004 Gehring et al. ............. 454/155
6,863,603 B1 * 3/2005 Demerath .................... 454/155

FOREIGN PATENT DOCUMENTS

| JP | U-4-20949 | 2/1992 |
| JP | A-2002-2259 | 1/2002 |

* cited by examiner

*Primary Examiner*—Gregory Wilson
(74) *Attorney, Agent, or Firm*—Posz Law Group, PLC (57) ABSTRACT

An air-conditioning resistor has a panel member formed with an opening for an operating element and an airflow port, a retainer formed on the panel member so as to communicate with the airflow port and to define interiorly an airflow passage for allowing air-conditioning air to flow therethrough, a lateral fin pivotably supported in the retainer and being capable of adjusting the wind direction of the air-conditioning air in the vertical direction, a vertical fin pivotably supported in the retainer and being capable of adjusting the wind direction of the air-conditioning air in the lateral direction, and a spherical operating element which can operate the vertical fin and the lateral fin simultaneously and has a partial spherical surfaces arranged so as to project from the opening for the operating element.

5 Claims, 8 Drawing Sheets

AIR-CONDITIONING RESISTOR AND OPERATING UNIT

The present application is based on Japanese Patent Application No. 2003-092359, which is incorporated herein by reference.

BACKGROUND OF THE INVENTION

1. Field of the Invention

The present invention relates to an air-conditioning resistor for adjusting wind direction of air-conditioning air. The present invention also relates to an operating unit used for operating the air-conditioning resistor and the like.

2. Description of the Related Art

An air-conditioning resistor is an apparatus for supplying air-conditioning air, which is controlled in temperature and in moisture content by an air-conditioner, into a cabin. Japanese Utility Model Publication No. Hei-4-20949 (JP-UM-4-20949) discloses an air-conditioning resistor including a joystick that can control a vertical fin and a lateral fin simultaneously. According to the air-conditioning resistor of the aforementioned JP-UM-4-20949, tilting displacement of the joystick is electrically detected as a voltage. Then, a driving motor swings the vertical fin and the lateral fin by an angle corresponding to the detected voltage.

However, according to the air-conditioning resistor in the aforementioned JP-UM-4-20949, it is necessary to provide a clearance, which corresponds to the operating allowance, that is, to the trajectory of tilting movement, of the joystick on a surface of a panel member for avoiding interference with other members. In other words, when the joystick is to be tilted leftward with respect to the surface of the panel member for example, it is necessary to provide a clearance for accommodating the movement of the joystick on the left side thereof on the surface of the panel member. From the same reason, when tilting the joystick rightward, upward, and downward, it is necessary to provide clearances in each direction. Therefore, it is necessary to provide clearances in all directions from the joystick in advance. Therefore, when the joystick is tilted leftward with respect to the surface of the panel member for example, clearances in other directions, such as the rightward, upward, and downward directions of the joystick are useless. In this manner, the operating allowance of the joystick changes depending on the operating direction. As a consequence, useless clearances are inevitably generated.

According to the air-conditioning resistor disclosed in the aforementioned JP-UM-4-20949, the joystick is projected from the panel member like a rod. In other words, the surface structure varies extremely between the panel member and the joystick. Therefore, uniformity between the joystick and the panel member in terms of design was low.

Unexamined Japanese Patent Publication 2002-2259 (JP 2002-2259) discloses an air-conditioning operating unit having two dials disposed coaxially at the distal end of the joystick. By rotating one of the dials, an exit opening for the air-conditioning air can be changed. By the other dial is rotated, the temperature of the air-conditioning air can be adjusted. By pivoting the entire joystick leftward and rightward, the mode can be changed between the outside air introducing state and the internal air circulating state.

However, the air-conditioning operating unit according to the aforementioned JP 2002-2259 has the same problem as the air-conditioning resistor according to the aforementioned JP-UM-4-20949. In other words, it is necessary to provide clearances for accommodating the tilting movement of the joystick both on the left and the right sides in advance. Therefore, when the joystick is tilted leftward for example, the clearance on the left side of the joystick is useless.

SUMMARY OF THE INVENTION

An air-conditioning resistor according to the present invention is completed in view the problem described above. Therefore, it is an object of the present invention to provide an air-conditioning resistor in which the operating allowance of an operating element is not changed with the operating direction, and uniformity between the operating element and the panel member in terms of design is high.

It is another object of the present invention to provide an operating unit which can be used for operating the air-conditioning resistor and the like, and in which the operating allowance of the operating element is not changed with the operating direction.

(1) In order to solve the problem described above, the air-conditioning resistor according to the present invention includes a panel member formed with an opening for an operating element and an airflow port, a retainer formed on the panel member so as to communicate with the airflow port and to define interiorly an airflow passage for allowing air-conditioning air to flow therethrough, a lateral fin pivotably supported in the retainer and being capable of adjusting the wind direction of the air-conditioning air in the vertical direction, a vertical fin pivotably supported in the retainer and being capable of adjusting the wind-direction of the air-conditioning air in the lateral direction, and a spherical operating element which can operate the vertical fin and the lateral fin simultaneously and has a partial spherical surface arranged so as to project from the opening for the operating element.

When the operator presses the partial spherical surface of the spherical operating element, the spherical operating element pivots in the pressed direction about the pivot shaft passing through the center point of the partial spherical surface. With such pivotal movement, at least one of the vertical fin and the lateral fin can be operated.

According to the air-conditioning resistor of the present invention, the volume of the portion of the spherical operating element projected from the opening for the operating element and the operating allowance of the spherical operating element are equivalent. In other words, the spherical operating element is simply pivoted about the pivot shaft passing through the center point of the partial spherical surface as if it rotates on its own axis no matter which direction the spherical operating element is pivoted. That is, the operating allowance of the spherical operating element does not change. Therefore, it is not necessary to provide clearances in all directions on the outer peripheral side of the spherical operating element in advance. As a consequence, no useless clearance is generated no matter which direction the spherical operating element is pivoted.

According to the air-conditioning resistor of the present invention, the spherical operating element is provided with the partial spherical surface projecting from the surface of the panel member. Consequently, the surface structure changes continuously between the panel member and the spherical operating element. Therefore, high uniformity in terms of design is achieved in the air-conditioning resistor of the present invention.

(2) Preferably, the spherical operating element is configured to include an operation angle display element on the partial spherical surface, and the coordinate of the operation angle display element at the opening for the operating element and the wind direction of the air-conditioning air blown out from the airflow port correspond to each other.

In other words, in this structure, the coordinate of the operation angle display element and the wind direction of the air-conditioning air correspond to each other. For example, when the operation angle display element is positioned at the upper left in the opening for the operating element, the air-conditioning air blows out from the airflow port in the upper left direction. In this structure, the operator can recognize the wind direction of the air-conditioning air only by viewing or touching the position of the operation angle display element. In other words, the operator can recognize the wind direction of the air-conditioning air relatively easily.

(3) Preferably, a ring-shaped operating element provided on the outer peripheral side of the spherical operating element so as to be adjacent thereto is employed. As described above, the operating allowance does not change no matter which direction the spherical operating element is pivoted. Therefore, it is not necessary to provide a clearance on the outer peripheral side of the spherical operating element for avoiding interference with other members. In view of such point, according to this structure, the ring-shaped operating element is disposed on the outer peripheral side of the spherical operating member so as to be adjacent thereto. The term "ring-shaped" in this structure includes a three-dimensional cylindrical shape as well as a flat ring shape.

(4) Preferably, in the structure stated in (3), the ring-shaped operating element is used for adjusting the temperature of the air-conditioning air. According to this structure, the operating element relating to the air-conditioning air (the spherical operating element, the ring-shaped operating element) can be disposed in a concentrated manner. Therefore, superior operability is achieved. It is also possible to coaxially dispose a plurality of ring-shaped operating elements.

(5) Preferably, a lateral fin link mechanism for mechanically linking the spherical operating element and the lateral fin, and a vertical fin link mechanism for mechanically linking the spherical operating element and the vertical fin are further provided.

The lateral fin link mechanism transmits only a vertical component of an input power exerted to the spherical operating element by the operator to the lateral fin, and allows the lateral fin to pivot in the vertical direction. In contrast, the vertical fin link mechanism transmits only a lateral component of the input power exerted to the spherical operating element by the operator to the vertical fin, and allows the vertical fin to pivot in the lateral direction.

In the case of the air-conditioning resistor disclosed in the aforementioned JP-UM-4-20949, the joystick is electrically connected with respect to the vertical fin and the lateral fin. In contrast, the lateral fin link mechanism in this structure mechanically connects the spherical operating element and the lateral fin. In the same manner, the vertical fin link mechanism mechanically connects the spherical operating element and the vertical fin. Therefore, the air-conditioning resistor in this structure may be simply configured.

(6) In order to solve the problem described above, the operating unit of the present invention includes the spherical operating element having the partial spherical surface arranged so as to be projected from the opening of the panel member and the ring-shaped operating element arranged on the outer peripheral side of the spherical operating element so as to be adjacent thereto.

The spherical operating element includes the partial spherical surface arranged so as to be projected from the opening of the panel member. The spherical operating member pivots about the pivot shaft passing through the center point of the partial spherical surface. Therefore, the volume of the spherical operating element projecting from the opening for the operating element and the operating allowance of the spherical operating element are equivalent. In other words, the operating allowance does not change no matter which direction the spherical operating element is pivoted. Therefore, it is not necessary to provide a clearance for avoiding interference with other members on the outer peripheral side of the spherical operating element. In view of this point, in the operating unit of the present invention, the ring-shaped operating element is disposed on the outer peripheral side of the spherical operating element so as to be adjacent thereto. According to the operating unit of the present invention, the operating allowance of the spherical operating element does not change with the operating direction thereof. Therefore, the spherical operating element and the ring-shaped operating element can be arranged close to each other. The term "ring-shape" in the operating unit of the present invention includes a three-dimensional cylindrical shape as well as a flat-shaped ring shape.

In the above operating unit according to (6), an optional first member can be directly or indirectly supported in the panel member pivotably in a vertical direction, and a optional second member can be directly or indirectly supported in the panel member pivotably in a lateral direction, and the spherical operating element can operate the first and second members simultaneously. Further, the spherical operating element may be constituted by a bipolar portion including an upper polar surface, a lower polar surface and an equator portion storage frame defined between the upper polar surface and the lower polar surface, and an equator portion being stored in the equator portion storage frame with an allowance for a pivotal movement in a lateral direction. The bipolar portion can be mechanically linked with the first member and the equator portion can be mechanically linked with the second member.

The above operating unit can be adapted for various systems such as a navigation system, an audio system, a vehicle-mounted camera, and a mirror. Accordingly, the first and second members may be various parts used for these systems.

DETAILED DESCRIPTION OF THE PREFRRED EMBODIMENTS

An embodiment of an air-conditioning resistor according to the present invention will be described below. The description below also includes the description of an embodiment of an operating unit of the present invention.

Figure 1:
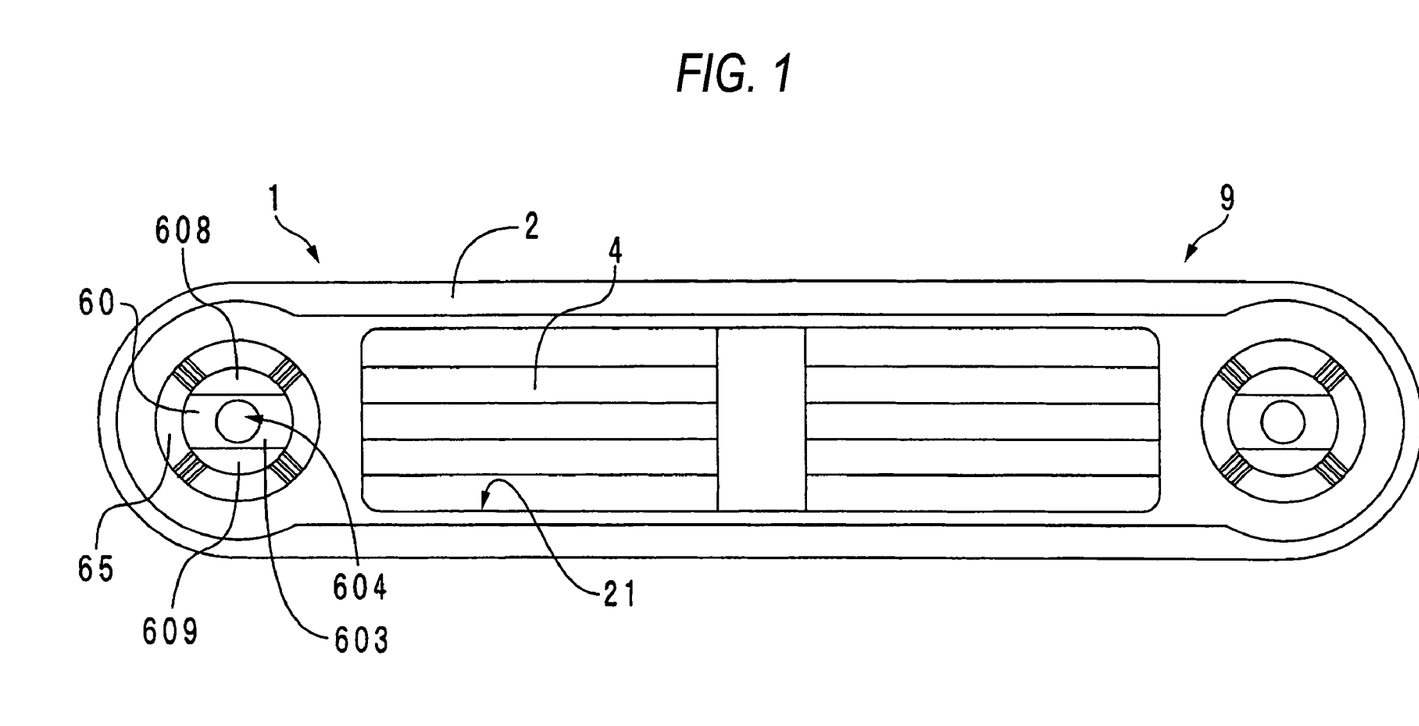
FIG. 1 is a front view of an air-conditioning resistor according to an embodiment of the present invention.

The structure of the air-conditioning resistor according to the present embodiment will be described first. In FIG. 1, a front view of the air-conditioning resistor according to the present embodiment is shown. A pair of air-conditioning resistors are disposed side-by-side on an instrument panel (not shown) at the widthwise (lateral) center of the vehicle. The right side of the drawing shows a resistor 9 for a driver's seat, and the left side of the drawing shows a resistor 1 for the front passenger's seat. The resistor 9 for the driver's seat and the resistor 1 for the front passenger's seat have the same structures, operations, and effects. Both of the resistors are included in the air-conditioning resistor according to the present invention. In this description, the resistor 1 for the front passenger's seat will be explained as a representative.

Figure 2:
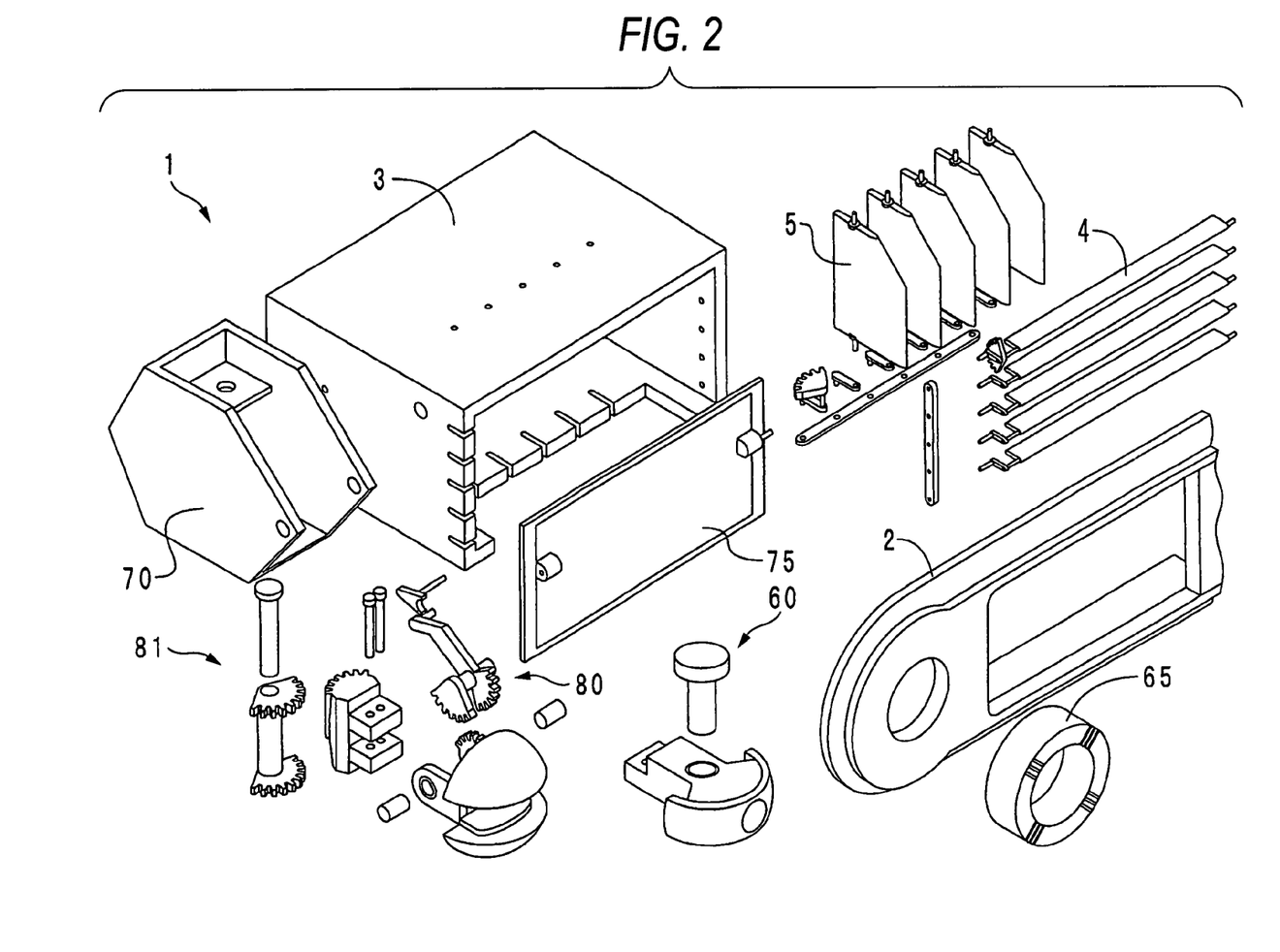
FIG. 2 is an exploded view of the resistor for the front passenger's seat.

FIG. 2 shows an exploded drawing of the resistor for the front passenger's seat. As shown in the figure, the resistor 1 for the front passenger's seat mainly includes a bezel 2, a retainer 3, a lateral fin 4, a vertical fin 5, a spherical operating element 60, a dial 65, an operating frame 70, a shut damper 75, a lateral fin rink mechanism 80, and a vertical fin link mechanism 81.

Figure 3:
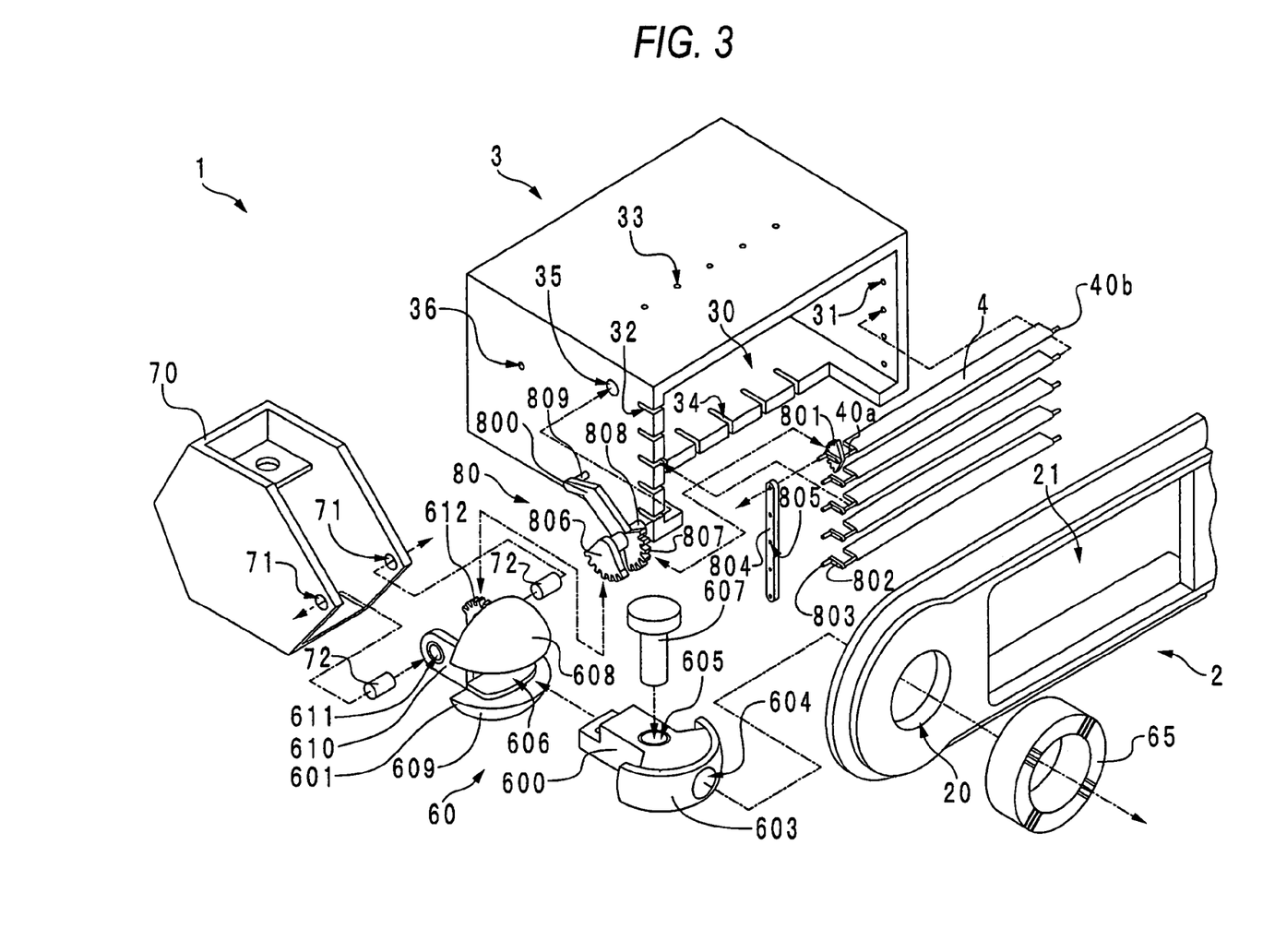
FIG. 3 is a drawing of members relating to the connection between the spherical operating element and the lateral fins extracted from FIG. 2.

Members relating to linking of the spherical operating element 60 and the lateral fin 4 will be described first. FIG. 3 is a drawing of members relating to linking of the spherical operating element and the lateral fin extracted from FIG. 2.

The bezel 2 is shared with the resistor 9 for the driver's seat shown in FIG. 1 above. The bezel 2 is formed of ABS (acrylonitrile-butadiene-styrene polymer), and is formed into a rectangular shape with the left and the right ends rounded. The bezel 2 is included in a panel member in the present invention. The bezel 2 is formed with an opening 20 for the operating element and an airflow port 21. The opening 20 for the operating element is formed into a circular shape. The airflow port 21 is formed into a rectangular shape. The airflow port 21 is disposed on the right side of the opening 20 for the operating element in juxtaposition.

The retainer 3 is formed of ABS and formed into a square tube shape but the shape of the retainer 3 is not limited to this. The retainer 3 is arranged outwardly of the cabin with respect to the bezel 2. In the retainer 3, an airflow passage 30 is defined. The airflow passage 30 communicates with an air-conditioning duct (not shown) on the upstream side. The airflow path 30 communicates with the airflow port 21 on the downstream side.

Lateral fin pivot holes 31 are formed on the cabin-side end of the right wall of the retainer 3. Five of such lateral fin pivot holes 31 in total are arranged in juxtaposition at predetermined intervals in the up and down direction (in the vertical direction). On the other hand, lateral fin pivot grooves 32 are formed on the cabin-side end of the left-side wall of the retainer 3. Five of such lateral fin pivot grooves 32 in total are arranged in juxtaposition at predetermined intervals in the vertical direction. The lateral fin pivot grooves 32 and the lateral fin pivot holes 31 face to each other in the left and right direction (in the lateral direction) The left wall of the retainer 3 is formed with an arm pivot hole 35 and a damper pivot hole 36.

The upper wall of the retainer 3 is formed with vertical fin pivot holes 33. Five of such vertical fin pivot holes 33 in total are arranged in juxtaposition at predetermined intervals in the lateral direction. The vertical fin pivot holes 33 are arranged outwardly of the cabin with respect to the lateral fin pivot holes 31 and the lateral fin pivot grooves 32. On the other hand, the bottom wall of the retainer 3 is formed with vertical fin pivot grooves 34. Five of such vertical fin pivot grooves 34 are arranged in juxtaposition at predetermined intervals in the lateral direction. The vertical fin pivot grooves 34 and the vertical fin pivot holes 33 face to each other in the vertical direction.

The dial 65 is formed of ABS and formed into a short cylindrical shape. The dial 65 is included in the ring-shaped operating element of the present invention. The dial 65 is rotatably arranged on the peripheral edge of the opening 20 for the operating element. By rotating the dial 65, the temperature of the air-conditioning air can be adjusted.

The spherical operating element 60 is provided with an equator portion 600, bipolar portion 601, and backside hemispherical portion (not shown). The equator portion 600 is formed of ABS and formed into a rectangular plate shape. At the end of the equator portion 600 on the cabin side is formed with an equator surface 603 of an arcuate shape substantially across 180° in the lateral direction. At the lateral center of the equator surface 603, a recess 604 is formed. The recess 604 is included in an operation angle display element of the present invention. The equator portion 600 is formed with a lateral pivot hole 605. The lateral pivot hole 605 passes through the equator portion 600 in the vertical direction.

The bipolar portion 601 is formed of ABS, and each formed into a hemisphere with the portion near the equator removed. At the end of the bipolar portion 601 on the cabin side, there are formed with an upper polar surface 608 and a lower polar surface 609 so as to be apart from each other in the vertical direction. An equator portion storage frame 606 is formed between the upper polar surface 608 and the lower polar surface 609. The equator portion 600 is stored in the equator portion storage frame 606 with an allowance for the pivotal movement in the lateral direction. When the equator portion 600 is stored, the equator surface 603 is arranged between the upper polar surface 608 and the lower polar surface 609 so as to be substantially flush therewith. The equator surface 603, the upper polar surface 608, and the lower polar surface 609 constitute the partial spherical surface in the present invention (See FIG. 1 described above).

A pair of lateral pivot shaft inserting seats (not shown) are formed on the end surfaces of the upper polar surface 608 and the lower polar surface 609 outwardly of the cabin so as to project therefrom. Each of such lateral pivot shaft inserting seat is formed with an axis insertion hole (not shown). When the equation portion 600 is stored in the equation portion storage frame 606, the lateral pivot hole 605 is interposed between the pair of upper and lower axis insertion holes. In other words, the pair of axis insertion holes and the lateral pivot hole 605 are aligned in series in the vertical direction. The lateral pivot shaft 607 is inserted into the axis insertion hole and the lateral pivotal hole 605. Therefore, the equation portion 600 can pivot in the lateral direction with respect to the bipolar portion 601. The center axis of the lateral pivot shaft 607 is determined to pass through the center point of the partial spherical surface formed of the equation surface 603, the upper polar surface 608 and the lower polar surface 609.

A pair of left and right vertical pivot pin insertion seats 610 are formed on the end surface of the bipolar portion 601 outwardly of the cabin so as to project therefrom. Each of the vertical pivot pin insertion seat 610 is formed with a pin insertion hole 611. The right vertical pivot pin insertion seat 610 is formed with a bipolar-portion-side gear 612 on the peripheral edge thereof.

The operating frame 70 is formed of ABS and shaped like a box opening upward and toward the interior of the cabin. On the left wall and the right wall of the operating frame 70 at the ends of the cabin side are respectively formed with frame-side pin insertion holes 71. The pair of frame-side pin insertion holes 71 face to each other in the lateral direction. The pair of vertical pivot pin insertion seats 610 is inserted between the left wall and the right wall of the operating frame 70. At this time, the pair of frame-side pin insertion holes 71 and the pair of pin insertion holes 611 are aligned in series in the lateral direction. By inserting the pin 72 into the frame-side pin insertion holes 71 and the pin insertion holes 611, the bipolar portion 601 (that is, the spherical operating element 60) is supported so as to be capable of vertical pivotal movement with respect to the operating frame 70. The center axis connecting the pair of pins 72 with each other is determined to pass through the center point of the partial spherical surface formed of the equation surface 603, the upper polar surface 608, and the lower polar surface 609.

The lateral fin 4 is formed of ABS and shaped like an elongated narrow plate. A lateral fin pivot shaft 40a is formed on the left end surface of the lateral fin 4 so as to project therefrom. The lateral fin pivot shaft 40a is inserted into the lateral fin pivot groove 32. On the other hand, a lateral fin pivot shaft 40b is projected from the right end surface of the lateral fin 4. The lateral fin pivot shaft 40b is inserted into the lateral fin pivot hole 31. Therefore, the lateral fin 4 is capable of pivotal movement in the vertical direction about the lateral fin pivot shafts 40a, 40b. Five of the lateral fins 4 in total are arranged in the retainer 3. More specifically, five of the lateral fins 4 are arranged in parallel with each other in the vertical direction.

A lateral fin link mechanism 80 connects between the spherical operating element 60 and the lateral fins 4. The lateral fin link mechanism 80 is provided with a pivot arm 800, a lateral-fin-side fan-shaped gear 801, a lateral fin connecting strip 802, and a lateral fin connecting rod 804. The pivot arm 800 is formed of ABS, and is shaped like an elongated narrow plate. A first gear 806 and a second gear 807 are arranged at the cabin-side end of the pivot arm 800. The first gear 806 and the second gear 807 are both formed into a fan-shape. The first gear 806 meshes with the bipolar-portion-side gear 612. An arm pivot shaft 808 is projected from the right wall of the second gear 807. The arm pivot shaft 808 is inserted into the arm pivot hole 35 of the retainer 3. The arm pivot shaft 808 is arranged coaxially with the center axes of the first gear 806 and the second gear 807. The pivot arm 800 is capable of pivotal movement in the vertical direction about the arm pivot shaft 808. On the other hand, a damper driving pin 809 is formed at the end of the pivot arm 800 so as to project rightward, that is, toward the retainer 3.

The lateral fin connecting strip 802 is formed of ABS and shaped like a letter L. The lateral fin connecting strip 802 is secured to the distal end of the lateral fin pivot shaft 40a of each of five lateral fins 4. The lateral-fin-side fan-shape gear 801 is secured to the lateral fin pivot shaft 40a of the uppermost lateral fin 4 out of the five lateral fins 4 arranged in juxtaposition in the vertical direction. The lateral-fin-side fan-shaped gear 801 meshes with the second gear 807. The lateral fin connecting strip 802 is provided with a lateral fin connecting shaft 803 extending leftward. The lateral fin connecting rod 804 is formed of ABS and is shaped like an elongated narrow plate. The lateral fin connecting rod 804 is formed with five lateral fin connecting holes 805 in total at predetermined intervals in the longitudinal direction. The lateral fin connecting shaft 803 is inserted into the lateral fin connecting hole 805.

Figure 4:
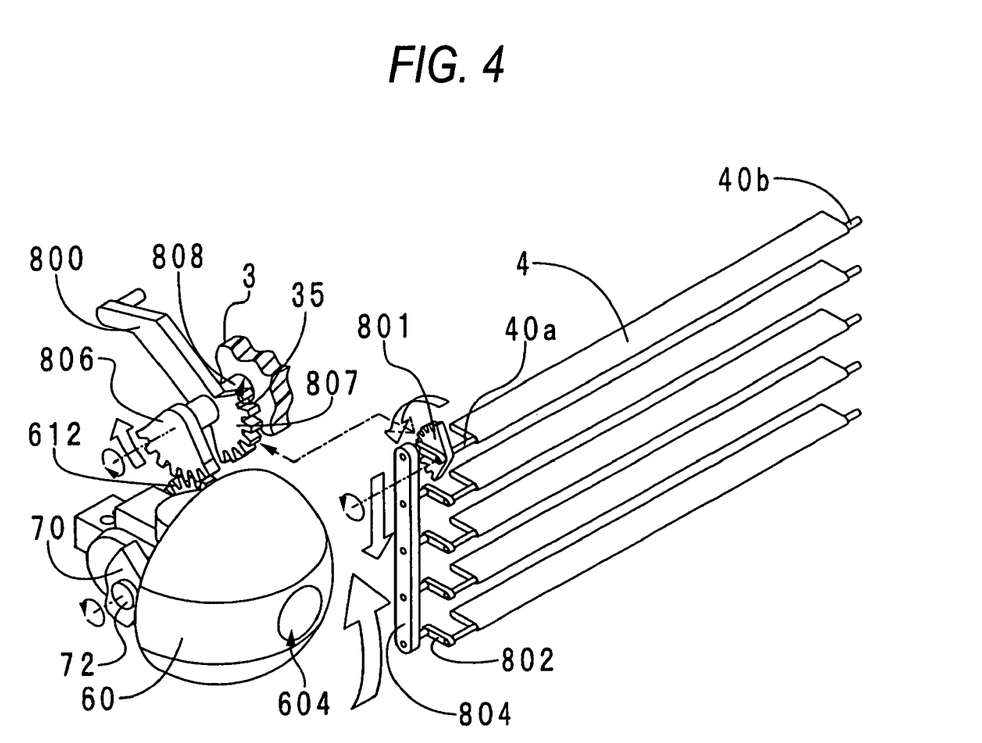
FIG. 4 is a drawing showing the connection between the spherical operating element and the lateral fins.

The movement of the lateral fins 4 will now be described. FIG. 4 shows connection between the spherical operating element and the lateral fins. As shown by a hollow arrow in the drawing, when the operator presses the recess 604 of the spherical operating element 60 upward, the spherical operating element 60 pivots about the pin 72 clockwise in the drawing. The bipolar-portion-side gear 612 of the spherical operating element 60 and the first gear 806 of the pivot arm 800 mesh with each other. Therefore, the pivot arm 800 pivots about the arm pivot shaft 808 clockwise in the drawing. The second gear 807 of the pivot arm 800 and the lateral-fin-side fan-shaped gear 801 mesh with each other. The lateral-fin-side fan-shaped gear 801 is secured to the lateral fin pivot shaft 40a of the uppermost lateral fin 4 out of the five lateral fins 4 arranged in juxtaposition in the vertical direction. Therefore, the uppermost lateral fin 4 pivots about the lateral fin pivot shafts 40a, 40b counter-clockwise in the drawing. The uppermost lateral fin 4 and the remaining four lateral fins 4 are connected by the lateral fin connecting strip 802 and the lateral fin connecting rod 804. Therefore, the remaining four lateral fins 4 pivot about the respective lateral fin pivot shafts 40a, 40b counter-clockwise in the drawing. In this manner, the five lateral fins 4 pivot counter-clockwise in the drawing all together. With such pivotal movement, the wind direction of the air-conditioning air is oriented upward. In order to orient the wind direction of the air-conditioning air downward, the recess 604 of the spherical operating element 60 may be pressed downward.

Figure 5:
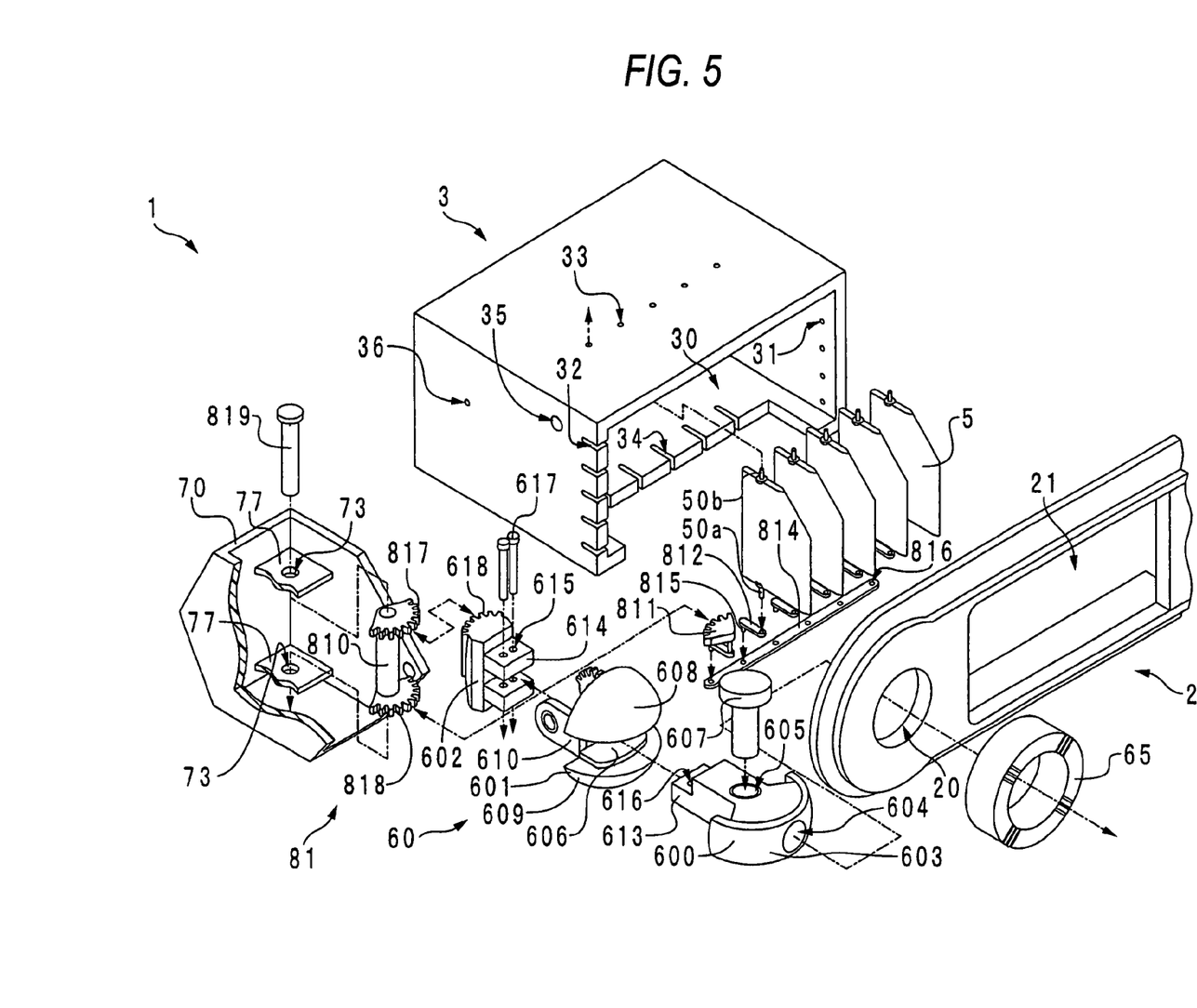
FIG. 5 is a drawing showing members relating to the connection between the spherical operating element and the vertical fins extracted from FIG. 2.

Subsequently, members relating to the connection between the spherical operating element 60 and the vertical fins 5 will be described. FIG. 5 shows members relating to the connection between the spherical operating element and the vertical fins extracted from FIG. 2. The structures of the bezel 2, the retainer 3 and the dial 65 have already described above. Therefore, the description of the structures of such members are omitted here.

The backside hemispherical portion 602 of the spherical operating element 60 is formed of ABS and has the shape cut out from a sphere. A pair of pin securing seats 614 are projected from the end surface of the backside hemispherical portion 602, which faces toward the cabin, at a distance in the vertical direction. A pin securing hole 615 is formed on each pin securing seat 614. On the other hand, an equation-side pin securing seat 613 is projected from the end of the equator portion 600, which faces outwardly of the cabin. An equator-portion-side pin securing hole 616 is formed on the equator-portion-side pin securing seat 613. When the equator portion 600 is stored in the storage frame 606 of the bipolar portion 601, the equator-portion-side pin securing seat 613 project from the bipolar portion 601 outwardly of the cabin. The projected equator-portion-side pin securing seat 613 is inserted between the pair of pin securing seats 614 of the backside hemispherical portion 602. At this time, the pin securing hole 615 and the equator-portion-side pin securing hole 616 are aligned in series in the vertical direction. A securing pin 617 is inserted into the pin securing hole 615 and the equator-portion-side pin securing hole 616.

In other words, by inserting the securing pin 617, the backside hemispherical portion 602 is secured to the equation portion 600. The backside hemispherical portion 602 is capable of pivotal movement about the lateral pivot shaft 607 in the lateral direction. A spherical gear 618 is arranged on the spherical surface of the backside hemispherical portion 602 facing outwardly of the cabin.

The vertical fins 5 are formed of ABS and each shaped like a rectangular plate. A vertical fin pivot shaft 50*a* is projected from the lower end surface of the vertical fin 5. The vertical fin pivot shaft 50*a* is inserted into the vertical fin pivot groove 34. On the other hand, a vertical fin pivot shaft 50*b* is projected from the upper end surface of the vertical fin 5. The vertical fin pivot shaft 50*b* is inserted into the vertical fin pivot hole 33. Therefore, the vertical fin 5 is capable of pivotal movement about the vertical fin pivot shafts 50*a*, 50*b* in the lateral direction. The vertical fin 5 is capable of pivotal movement about the vertical fin pivotal shafts 50*a*, 50*b* in the lateral direction. Five of such vertical fins 5 in total are arranged in the retainer 3. More specifically, the five vertical fins 5 are arranged in parallel with each other in the lateral direction.

The vertical fin link mechanism 81 connects between the spherical operating element 60 and the vertical fin 5. The vertical fin link mechanism 81 includes a sleeve 810, a vertical-fin-side fan-shaped gear 811, a vertical fin connecting strip 812, and a vertical fin connecting rod 814. The sleeve 810 is formed of ABS and has a cylindrical shape. A first gear 817 is arranged at the upper end of the sleeve 810. The first gear 817 meshes with the spherical surface gear 618. A second gear 818 is arranged at the lower end of the sleeve 810. On the other hand, a pair of sleeve mounting seats 77 is arranged in the operating frame 70 at a distance in the vertical direction. Each of the mounting seats 77 is formed with a mounting hole 73. The sleeve 810 is interposed between the pair of sleeve mounting seats 77. When the sleeve 810 is interposed therebetween, the pair of mounting holes 73 and the sleeve 810 are aligned in series in the vertical direction. A sleeve pivot pin 819 is inserted into the mounting holes 73 and the sleeve 810. Therefore, the sleeve 810 is capable of pivotal movement about the sleeve pivot pin 819 in the lateral direction. The vertical fin connecting rod 814 is formed of ABS and is shaped like an elongated narrow plate. The vertical fin connecting rod 814 is arranged downwardly of the vertical fin 5. The vertical fin connecting rod 814 is formed with six vertical fin connecting holes 816 in total at predetermined intervals in the longitudinal direction. Vertical fin connecting shafts 815 of the six vertical fin connecting strips 812 are inserted into the six vertical fin connecting holes 816. The vertical fin connecting strip 812 is formed of ABS and is shaped like a letter L. The vertical-fin-side fan-shaped gear 811 is secured to the leftmost vertical fin connecting strip 812 of the six vertical fin connecting strips 812. The vertical-fin-side fan-shaped gear 811 meshes with the second gear 818. The distal end of the vertical fin pivot shafts 50*a* of the five vertical fins 5 are secured to the remaining five vertical connecting strips 812.

Figure 6:
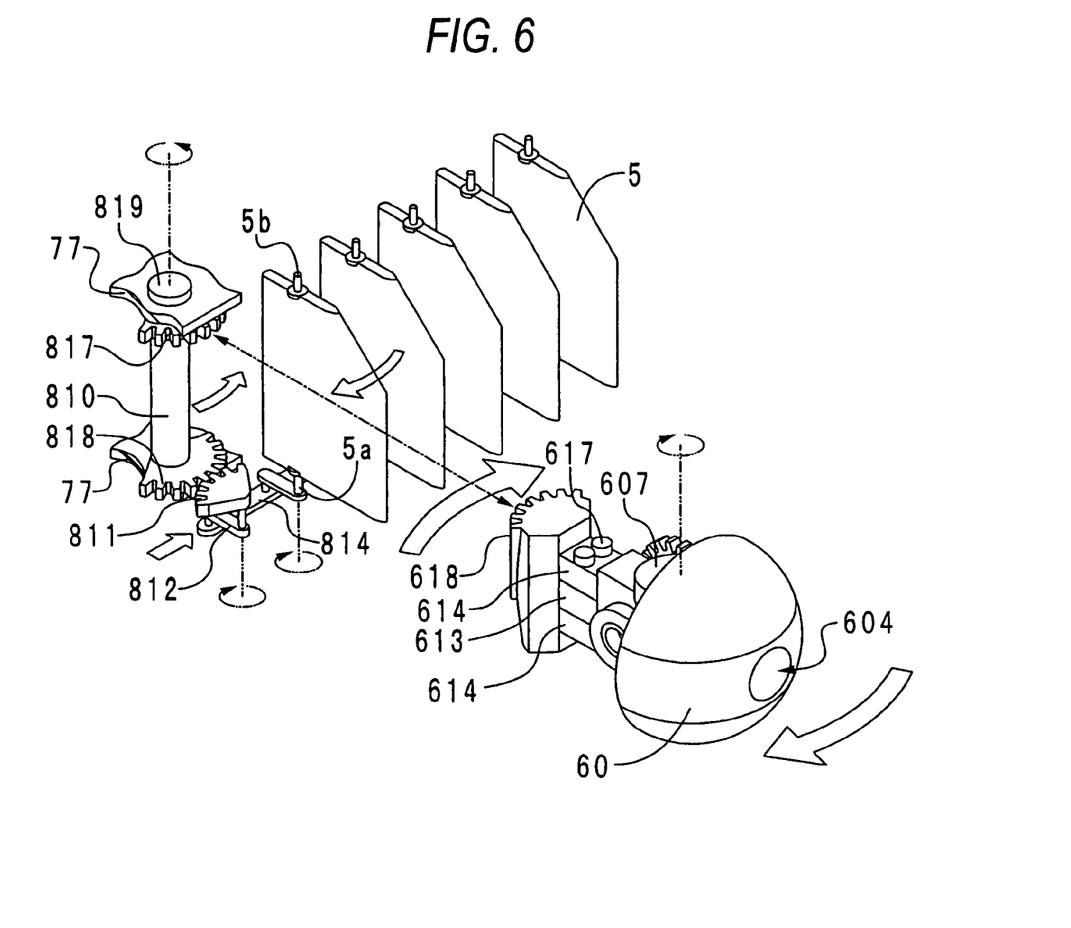
FIG. 6 is a drawing showing the connection between the spherical operating element and the vertical fins.

Subsequently, the movement of the vertical fins 5 will be described. FIG. 6 is a drawing showing a connection between the spherical operating element and the vertical fins. As shown by a hollow arrow in the drawing, when the operator presses the recess 604 of the spherical operating element 60 leftward, the spherical operating element 60 pivots about the lateral pivot shaft 607 clockwise in the drawing. The spherical gear 618 of the spherical operating element 60 and the first gear 817 of the sleeve 810 mesh with each other. Therefore, the sleeve 810 pivots about the sleeve pivot pin 819 counter-clockwise in the drawing. The second gear 818 of the sleeve 810 and the vertical-fin-side fan-shaped gear 811 mesh with each other. The vertical-fin-side fan-shaped gear 811 is secured to the leftmost vertical fin connecting strip 812 of the six vertical fin connecting strips 812 arranged in the lateral direction. Therefore, the leftmost vertical fin connecting strip 812 pivots about the center axis of the vertical-fin-side fan-shaped gear 811 clockwise in the drawing. The leftmost vertical fin connecting strip 812 and the remaining five vertical fin connecting strips 812, that is, the five vertical fins 5 are connected via the vertical fin connecting rod 814. Therefore, the five vertical fins 5 pivot about the respective vertical fin pivot shafts 50*a*, 50*b* clockwise in the drawing. In this manner, the five vertical fins 5 pivot clockwise in the figure together. With such pivotal movement, the wind direction of the air-conditioning air is oriented leftward. In order to orient the wind direction of the air-conditioning air rightward, the recess 604 of the spherical operating element 60 may be pressed rightward.

In order to change the wind direction of the air-conditioning air to the oblique direction, that is, in order to move the lateral fins 4 and the vertical fins 5 simultaneously, the recess 604 of the spherical operating element 60 may be pressed in the oblique direction.

Figure 7:
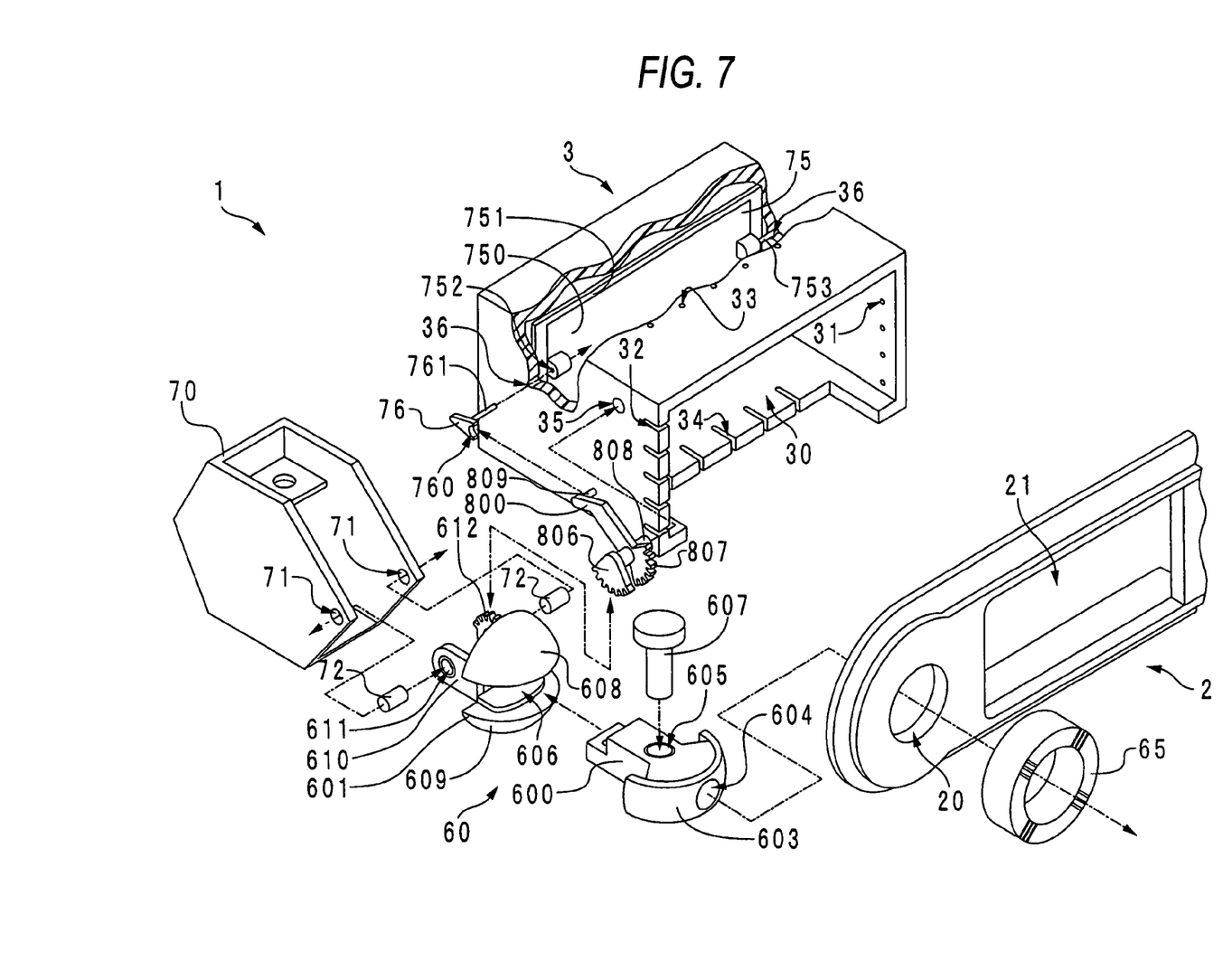
FIG. 7 is a drawing showing members relating to the connection between the spherical operating element and the shut damper extracted from FIG. 2.

Subsequently, members relating to the connection between the spherical operating element 60 and the shut damper 75 will be described. FIG. 7 is a drawing showing members relating to the connection between the spherical operating element and the shut damper extracted from FIG. 2. The structures of the bezel 2, the retainer 3, the dial 65, the spherical operating element 60, and the operating frame 70 have described above. Therefore, the description of the structures of these members will be omitted here.

The shut damper 75 is provided with a damper body 750 and a sealing member 751. The damper body 750 is formed of ABS and shaped like a rectangular plate. The damper body 750 is formed with a body pivot hole 752 on the left end thereof. The body pivot hole 752 is aligned with the damper pivot hole 36 on the left wall of the retainer in series. On the other hand, a damper pivot shaft 753 is projected from the right end of the damper body 750. The damper pivot shaft 753 is inserted into the damper pivot hole 36 on the right wall of the retainer 3. The sealing member 751 is formed of sponge, and is shaped like a square ring. The sealing member 751 is fitted to the peripheral edge of the damper body 750.

A damper driving strip 76 is formed of ABS and is shaped like a triangular plate. A damper driving recess 760 is formed on one side of the damper driving strip 76. The damper driving recess 760 is arranged on the lower trajectory of a damper driving pin 809 of the pivot arm 800 at a predetermined distance therefrom. The damper driving recess 706 is capable of engaging the damper driving pin 809 of the pivot arm 800. A damper driving shaft 761 is projected from the right side surface of the damper driving strip 76. The damper driving shaft 761 passes through the damper pivot hole 36 on the left wall of the retainer 3. The damper driving shaft 761 is inserted into and secured to the body pivot hole 752. The shut damper 75 is capable of pivotal movement about the damper driving shaft 761 and the damper pivot shaft 753 in the vertical direction.

Figure 8:
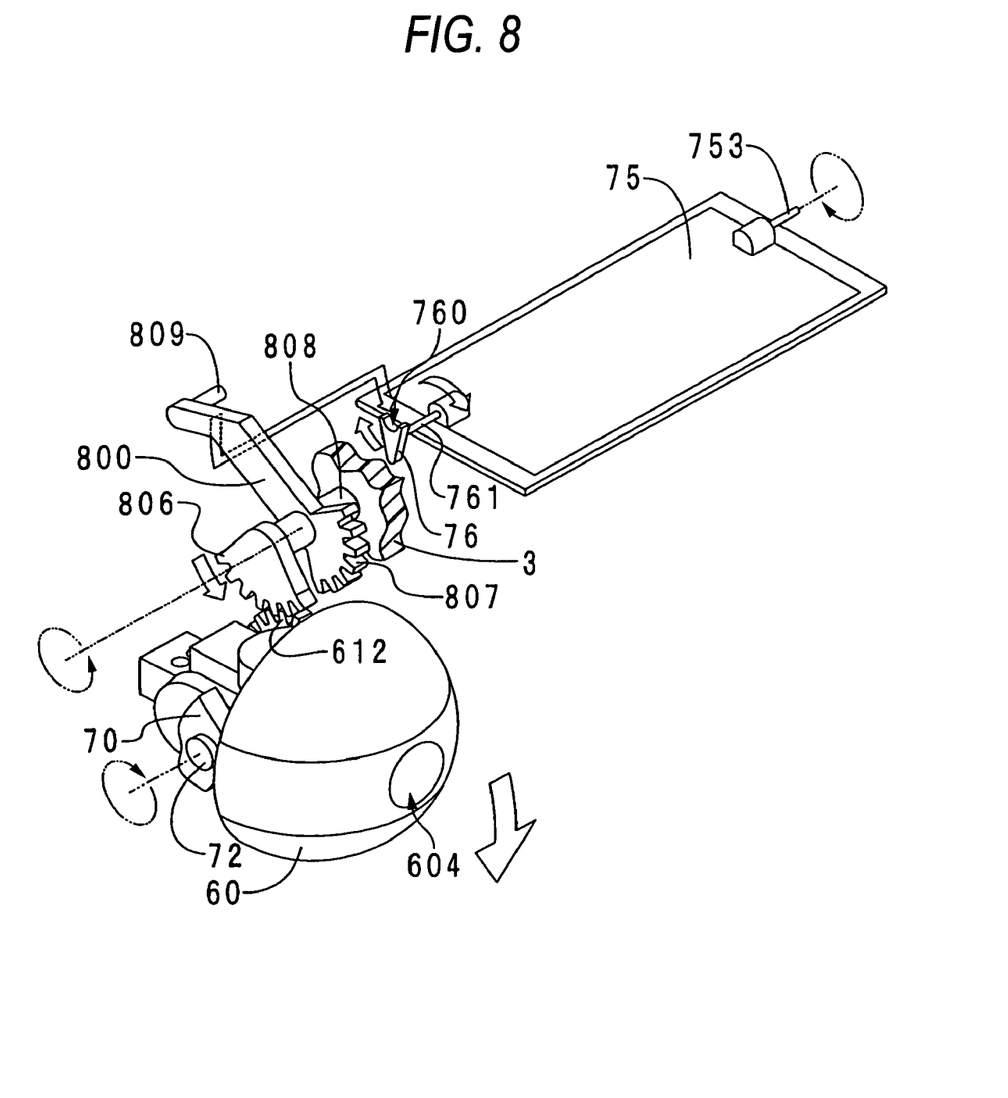
FIG. 8 is a drawing showing the connection between the spherical operating element and the shut damper.

Subsequently, the movement of the shut damper 75 will be described. FIG. 8 is a drawing showing the connection between the spherical operating element and the shut damper. FIG. 8 shows a state in which the shut damper 75 opens the airflow path. As shown by a hollow arrow in the drawing, when the operator presses the recess 604 of the spherical operating element 60 downward, the spherical operating element 60 pivots about the pin 72 clockwise in the drawing. The bipolar-portion-side gear 612 of the spherical operating element 60 and the first gear 806 of the pivot arm 800 mesh with each other. Therefore, the pivot arm 800 pivots about the arm pivot shaft 808 counter-clockwise in the drawing. Therefore, the damper driving pin 809 pivots downward. The damper driving recess 760 of the damper driving strip 76 is disposed on the lower trajectory of the damper driving pin 809 at predetermined distance therefrom. Therefore, when the damper driving pin 809 pivots downward by a predetermined distance (when the operator moves the recess 604 of the spherical operating element 60 largely downward), the damper driving pin 809 engages the damper driving recess 760. When the damper driving pin 809 pivots further downward after engagement, the damper driving strip 76 pivots about the damper driving shaft 761 and the damper pivot shaft 753 clockwise in the drawing. The damper driving strip 76 is secured to the shut damper 75. Therefore, the shut damper 75 pivots clockwise in the drawing together with the damper driving strip 76. In this manner, the shut damper 75 is erected. Then, the shut damper 75 closes the airflow passage. In order to open the airflow path again by the shut damper 75, the recess 604 of the spherical operating element 60 may be pressed upward.

The effect of the resistor 1 for the front passenger's seat according to the present embodiment will be described. The spherical operating element 60 of the resistor 1 for the front passenger's seat according to the present embodiment includes a partial spherical surface including the equator surface 603, the upper polar surface 608 and the lower polar surface 609. The spherical operating element 60 pivots about the pivot shaft (the pair of pins 72 for the pivotal movement in the vertical direction and the lateral pivot shaft 607 for the pivotal movement in the lateral direction) passing through the center point of the partial spherical surface. Therefore, the volume of the spherical operating element 60 projecting from the opening 20 for the operating element and the operating allowance of the spherical operating element 60 are equivalent. In other words, the spherical operating element 60 simply pivots about the pivot shaft passing through the center point of the partial spherical surface as if it rotates about its own axis no matter which direction the spherical operating element 60 is pivoted. In other words, the operating allowance of the spherical operating member 60 does not change. Therefore, it is not necessary to provide clearances in all directions on the outer peripheral side of the spherical operating element 60 in advance. As a consequence, no useless clearance is generated no matter which direction the spherical operating element 60 is pivoted.

According to the resistor 1 for the front passenger's seat in the present embodiment, the spherical operating element 60 is provided with the partial spherical surface projecting from the surface of the bezel 2. Consequently, the surface structure changes continuously between the bezel 2 and the spherical operating element 60. Therefore, high uniformity in terms of design is achieved in the air-conditioning resistor 1 for the front passenger's seat of the present invention.

According to the resistor 1 for the front passenger's seat of the present embodiment, the coordinate of the opening 20 for the operating element of the recess 604 and the wind direction of the air-conditioning air correspond with each other. Therefore, the operator can recognize the wind direction of the air-conditioning air only by viewing or touching the position of the recess 604. In other words, the operator can recognize the wind direction of the air-conditioning air relatively easily.

According to the resistor 1 for the front passenger's seat of the present embodiment, the dial 65 for adjusting the temperature of the air-conditioning air is disposed on the outer peripheral side of the spherical operating element 60 so as to be adjacent thereto. In other words, according to the resistor 1 for the front passenger's seat of the present embodiment, the operating element relating to the air-conditioning air (the spherical operating element 60, the dial 65) can be disposed in a concentrated manner. Therefore, superior operability is achieved. In addition, when the operator operates the spherical operating element 60 with his/her finger, the inner peripheral surface of the dial 65 serves just as a stopper. In other words, since the inner peripheral surface of the dial 65 limits the movement of the finger, excessive pivotal movement of the spherical operating element 60 may be controlled.

In the resistor for the front passenger's seat according to the present embodiment, the lateral fin link mechanism 80 is arranged between the spherical operating element 60 and the lateral fins 4. On the other hand, the vertical fin link mechanism 81 is arranged between the spherical operating element 60 and the vertical fins 5. In the case of the air-conditioning resistor disclosed in the aforementioned JP-UM-4-20949, the joystick is electrically connected to the lateral fins and the vertical fins. In contrast, according to the present embodiment, the spherical operating element 60 is mechanically connected to the lateral fins 4 and the vertical fins 5 via the lateral fin link mechanism 80 and the vertical fin link mechanism 81. Therefore, the operational reliability of the resistor 1 for the front passenger's seat according to the present embodiment is high. The feeling of operation of the spherical operating member 60 is similar relatively to the electrical operation although they are mechanically connected. In other words, the feeling of operation as if operating a mouse is achieved. Therefore, the operational quality of the resistor 1 for the front passenger's seat according to the present embodiment is high.

In the air-conditioning resistor disclosed in the aforementioned JP-UM-4-20949, a ball joint for connecting members via spherical joint is employed, and the lateral fin and the vertical fin are operated by the ball joint. The spherical surface of the ball joint requires high degree of surface accuracy in order to achieve an agreeable feeling of operation and, in particular, the sphericity affects much on the feeling of operation. The ball joint with high degree of surface accuracy, in particular, with high sphericity costs much. As a consequence, according to the air-conditioning resistor disclosed in the aforementioned JP-UM-4-20949, manufacturing cost increases. In contrast, according to the resistor 1 for the front passenger's seat of the present embodiment, the lateral fins 4 and the vertical fins 5 are operated by the lateral fin link mechanism 80 and the vertical fin link mechanism 81 instead of the ball joint. Therefore, since the ball joint is not used, the manufacturing cost may be decreased correspondingly.

The embodiment of the air-conditioning resistor of the present invention has been described thus far. However, the mode for carrying out the invention is not limited to the embodiment described above. Various modified modes and improved mode that can be implemented by those skilled in the art may be employed.

For example, although the cylindrical dial 65 is arranged as the ring-shaped member in the present embodiment, the shape of the ring-shaped member may be a flat plate ring shape. It may be implemented in a mode that does not include a ring-shaped member arranged therein. Alternatively, a plurality of ring-shaped members may be arranged coaxially.

Although the recess 604 is arranged as the operation angle display element in the present embodiment, it is also possible to arrange a projection. Alternatively, it is also possible to draw vertical and lateral lines on the partial spherical surface and use those lines as the operation angle display element.

It is also possible to allow a point on the partial spherical surface to emit light and use this light-emitting point as the operation angle display element. This improves visibility during the night or the like. In this case, by allowing the opening edge of the opening 20 for the operating element to emit light as well, visibility is further improved.

The operating unit of the present invention may be used not only for operating the air-conditioning resistor, but also for operating, for example, a navigation system, an audio system, a vehicle-mounted camera, and a mirror.

According to the present invention, an air-conditioning resistor, in which the operating allowance of the operating element does not change with the operating direction, and high uniformity in terms of design between the operating element and the panel member is achieved, is provided. In addition, according to the present invention, the operating unit which is used for operating the air-conditioning resistor, and in which the operating allowance of the operating element does not change with the operating direction is provided.

What is claimed is:

1. An air-conditioning resistor comprising:
    a panel member formed with an opening for an operating element and an airflow port;
    a retainer formed on the panel member so as to communicate with the airflow port and to define interiorly an airflow passage for allowing air-conditioning air to flow therethrough;
    a lateral fin pivotably supported in the retainer and being capable of adjusting a wind direction of the air-conditioning air in a vertical direction;
    a vertical fin pivotably supported in the retainer and being capable of adjusting the wind direction of the air-conditioning air in the lateral direction; and
    a spherical operating element which can operate the vertical fin and the lateral fin simultaneously and has a partial spherical surface arranged so as to project from the opening for the operating element, wherein a recess is formed on the spherical operating element; and
    a ring-shaped operating element on the outer peripheral side of and adjacent to the spherical operating element, wherein the ring-shaped operating element includes a cylindrical dial and is used for adjusting the temperature of the air-conditioning air.

2. An air-conditioning resistor according to claim 1, wherein the spherical operating element comprises an operation angle display element on the partial spherical surface, and the coordinate of the operation angle display element at the opening for the operating element and the wind direction of the air-conditioning air blown out from the airflow port correspond to each other.

3. An air-conditioning resistor according to claim 1, further comprising a lateral fin link mechanism, for mechanically linking the spherical operating element and the lateral fin, and a vertical fin link mechanism, for mechanically linking the spherical operating element and the vertical fin.

4. An air-conditioning resistor according to claim 3, wherein the spherical operating element comprises a bipolar portion including an upper polar surface, a lower polar surface and an equator portion storage frame defined between the upper polar surface and the lower polar surface, and an equator portion being stored in the equator portion storage frame with an allowance for a pivotal movement in a lateral direction, and wherein the bipolar portion is mechanically linked with the lateral fin via the lateral fin link mechanism, and the equator portion is mechanically linked with the vertical fin via the vertical fin link.

5. An air-conditioning resistor according to claim 1, further comprising a shut damper pivotably supported in the retainer and being capable of opening and closing the airflow path, the spherical operating element can also operate the shut damper.

* * * * *